United States Patent [19]

Hertler et al.

[11] Patent Number: 4,656,233

[45] Date of Patent: Apr. 7, 1987

[54] "LIVING" POLYMERS AND CHAIN TRANSFER-REGULATED POLYMERIZATION PROCESS

[75] Inventors: Walter R. Hertler, Kennett Square, Pa.; Dotsevi Y. Sogah, Wilmington, Del.

[73] Assignee: E. I. Du Pont de Nemours and Company, Wilmington, Del.

[21] Appl. No.: 786,101

[22] Filed: Oct. 15, 1985

Related U.S. Application Data

[63] Continuation-in-part of Ser. No. 676,099, Nov. 29, 1984, abandoned.

[51] Int. Cl.$^4$ .............................................. C08F 4/44
[52] U.S. Cl. ..................................... 526/190; 526/89; 526/194; 526/204; 526/213; 526/217; 526/222; 526/262; 526/317.1; 526/329.7
[58] Field of Search ................. 526/89, 190, 194, 204, 526/213, 217, 222, 262, 329.7, 317.1

[56] References Cited

U.S. PATENT DOCUMENTS

| | | | |
|---|---|---|---|
| 3,965,080 | 6/1976 | Hargis et al. | 526/183 |
| 4,417,034 | 11/1983 | Webster | 526/190 |
| 4,581,428 | 4/1986 | Farnham et al. | 526/190 |
| 4,588,795 | 5/1986 | Dicker et al. | 526/190 X |

FOREIGN PATENT DOCUMENTS 0709226  5/1954  United Kingdom ............... 526/331

*Primary Examiner*—Joseph L. Schofer
*Assistant Examiner*—F. M. Teskin

[57] ABSTRACT

Improved process of polymerizing a polar monomer with selected initiators and catalysts, the improvement consisting of having present a chain transfer agent having a pKa greater than 18 but less than 25 and containing at least one reactive hydrogen atom which terminates the growth of "living" polymer.

30 Claims, No Drawings

"LIVING" POLYMERS AND CHAIN TRANSFER-REGULATED POLYMERIZATION PROCESS

CROSS-REFERENCE TO RELATED APPLICATION

This is a continuation-in-part of application Ser. No. 676,099 filed Nov. 29, 1984 and expressly abandoned Oct. 15, 1985.

BACKGROUND OF THE INVENTION

1. Field of the Invention

This invention relates to a chain transfer-regulated process for polymerizing polar, acrylic-type or maleimide monomers.

2. Background

U.S. Pat. Nos. 4,414,372; 4,417,034; 4,508,880; and 4,524,196 and U.S. patent application Ser. Nos. 701,681, filed Feb. 14, 1985 and allowed Feb. 21, 1986 and 707,193, filed Mar. 1, 1985 and issued May 13, 1986 as U.S. Pat. No. 4,588,795, hereinafter referred to as "the aforesaid patents", disclose processes for polymerizing certain polar monomers to "living" polymers. More specifically, the aforesaid patents disclose processes of polymerizing the monomer selected from the group consisting of $CH_2=C(Y)X$,

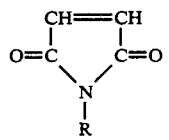

and mixtures thereof wherein:

X is —CN, —CH=CHC(O)X' or —C(O)X';

Y is —H, —CH$_3$, —CN or —CO$_2$R, provided, however, when X is —CH=CHC(O)X', Y is —H or —CH$_3$;

X' is —OSi(R$^1$)$_3$, —R, —OR or —NR'R";

each R$^1$, independently, is a hydrocarbyl radical which is an aliphatic, alicyclic, aromatic or mixed aliphatic-aromatic radical containing up to 20 carbon atoms;

R is a hydrocarbyl radical which is an aliphatic, alicyclic, aromatic or mixed aliphatic-aromatic radical containing up to 20 carbon atoms, optionally containing one or more ether oxygen atoms within aliphatic segments thereof and optionally containing one or more functional substituents that are unreactive under polymerizing conditions; and each of R' and R" is independently selected from C$_{1-4}$ alkyl by contacting the one or more monomers under polymerizing conditions with:

(i) the initiator of the formula (R$^1$)$_3$MZ wherein:
R$^1$ is as defined above;
Z is an activating substituent selected from the group consisting of

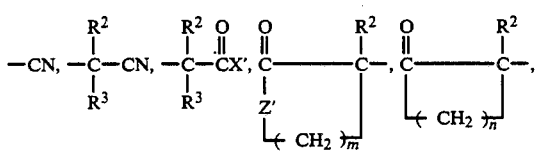

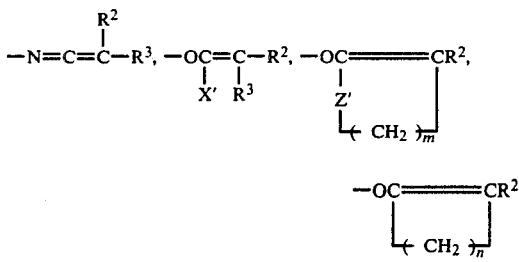

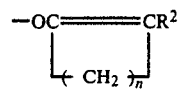

and mixtures thereof wherein:

X' is as defined above for the monomer;

each of R$^2$ and R$^3$ is independently selected from H and hydrocarbyl, defined as for R above;

Z' is O or NR', wherein R' is as defined above;

m is 2, 3 or 4;

n is 3, 4 or 5; and

M is Si, Sn, or Ge, provided, however, when Z is

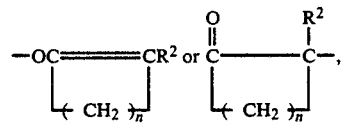

M is Sn or Ge; and (ii) a co-catalyst which is a source of bifluoride ions HF$_2^-$, a source of fluoride, cyanide or azide ions, a suitable Lewis acid, for example, zinc chloride, bromide or iodide, boron trifluoride, alkylaluminum oxide or an alkylaluminum chloride, a suitable nonanionic Lewis base, or a source of oxyanions whose conjugate acids have a pKa in dimethylsulfoxide (DMSO) at 25° C. of about 5 to about 24, to produce "living" polymer having repeat units of the one or more monomers, said process further characterized in that: .

(a) R$^1$ is H, provided that at least one R$^1$ group is not H; and/or (b) R is a polymeric radical containing at least 20 carbon atoms and optionally containing one or more ether oxygen atoms within aliphatic segments thereof and optionally containing one or more functional substituents that are unreactive under polymerizing conditions; and/or (c) at least one of any R group in the monomer contains one or more reactive substituents of the formula —Z'(O)C—C(Y$^1$)=CH$_2$ wherein Y$^1$ is H or CH$_3$ and Z' is as defined above; and/or (d) the initiator is of the formula (R$^1$)$_2$M(Z$^1$)$_2$ or O[M(R$^1$)$_2$Z$^1$]$_2$ wherein
R$^1$ and M are as defined above and Z$^1$ is

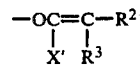

wherein X', R$^2$ and R$^3$ are as defined above; and/or (e) at least one of any R, R$^2$ and R$^3$ in the initiator contains one or more initiating substituents of the formula —Z$^2$—M(R$^1$)$_3$ wherein
M and R$^1$ are as defined above; and
Z$^2$ is a diradical selected from the group consisting of

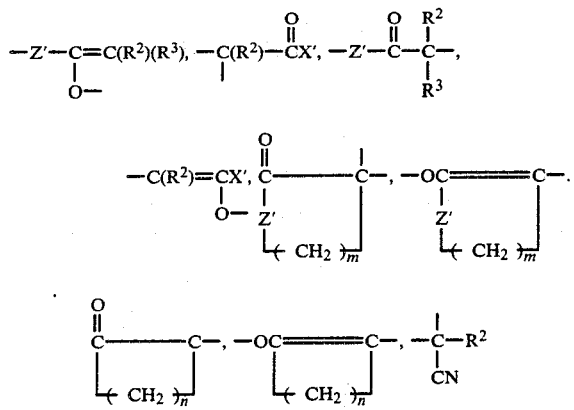

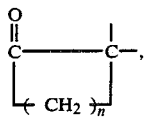

and mixtures thereof, wherein $R^2$, $R^3$, $X'$, $Z'$, m and n are as defined above, provided, however, when $Z^2$ is

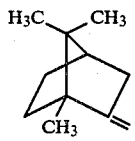

M is Sn or Ge; and/or (f) Z is selected from the group consisting of —SR, —OP(NR'R")$_2$, —OP(OR$^1$)$_2$, —OP[OSi(R$^1$)$_3$]$_2$ and mixtures thereof, wherein R, R$^1$, R' and R" are as defined above; and/or (g) R$^2$ and R$^3$ taken together are

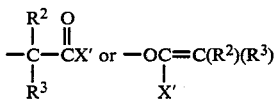

provided, however, Z is

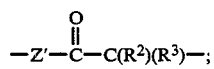

and/or Z$^2$ is $$-Z'-\overset{O}{\overset{\|}{C}}-C(R^2)(R^3)-;$$

and/or (h) X' and either R$^2$ or R$^3$ taken together are

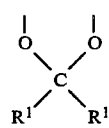

provided, however, Z is

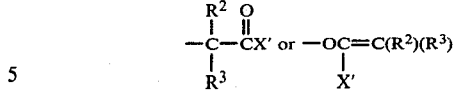

and/or Z$^2$ is

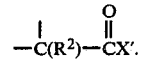

As further disclosed in the aforesaid patents, although these processes resemble anionic polymerization, there are significant differences which have commercial significance. These differences include the ability to copolymerize methacrylate and acrylate monomers, or combinations of acrylate monomers, for example, ethyl and sorbyl acrylates, to relatively monodisperse copolymers. Such copolymers are difficult or impossible to obtain by known processes such as anionic polymerization or free-radical polymerization. Moreover, whereas anionic polymerization processes which provide relatively monodisperse polymers are carried out at low temperatures, usually well below $-10°$ C., which require expensive refrigeration equipment for commercial operation, the polymerization processes of the patents are operable over a wide temperature range, from about $-100°$ C. to about 150° C., and they are conveniently operable with many commercially important monomers at about ambient temperatures.

It is an object of this invention to provide a chain transfer-regulated modification of the processes disclosed in the aforesaid patents. A further object is to provide such a modification by means of which the molecular weight of the polymer produced can be controlled. Still another object is to provide chain transfer agents which are suitable in the processes of the aforesaid patents but which are inoperable in conventional art-recognized anionic processes for polymerizing the same type of monomer. These and other objects will be apparent from the disclosure which follows.

DETAILED DESCRIPTION OF THE INVENTION

For further comprehension of the invention, and of the objects and advantages thereof, reference may be made to the following description and to the appended claims in which the various novel features of the invention are more particularly set forth.

For simplification of this disclosure, the processes of the aforesaid patents are hereby summarized as a process of preparing a "living" polymer, the process comprising contacting under polymerizing conditions at least one polar, acrylic-type or maleimide, alpha-olefinic monomer with (i) a tetracoordinate organosilicon, organotin or organogermanium polymerization initiator having at least one initiating site, and (ii) a suitable cocatalyst, as disclosed in the aforesaid patents, the polymerization being characterized by the presence of an organosilicon, organotin or organogermanium moiety, from the initiator, at "living" ends of the polymer, the initiator optionally having one or more substituents that are inert under polymerizing conditions.

The invention herein resides in an improvement in the polymerization process of the aforesaid patents, the improvement characterized in that there is present during at least a part of the polymerization process a chain transfer agent which is a carbon acid having a pKa in the range 18<pKa<25 and which contains at least one reactive hydrogen atom which terminates the growth of "living" polymer. By pKa of a chain transfer agent is meant the negative logarithm of the acidity constant of the chain transfer agent, measured in dimethylsulfoxide (DMSO).

More specifically, the invention resides in the chain transfer agent-regulated process comprising:

(a) contacting under polymerizing conditions at least one polar, acrylic-type or maleimide alpha-olefinic monomer with (i) a tetracoordinate organosilicon, organotin or organogermanium polymerization initiator having at least one initiating site, and (ii) a co-catalyst which is a source of bifluoride, fluoride, cyanide, or azide ions or which is a suitable oxyanion, Lewis acid or nonanionic Lewis base, to produce "living" polymer having an organosilicon, organotin or organogermanium moiety, from the initiator, at the "living" ends of the polymer;

(b) contacting "living" polymer produced in the process and having an organosilicon, organotin or organogermanium moiety at the "living" ends with a chain transfer agent which is a carbon acid having a pKa in the range of 18<pKa<25 and which contains at least one reactive hydrogen atom which terminates the growth of "living" polymer, so as to terminate the growth of at least some of the "living" polymer and to form a polymerization initiator having at least one initiating site and consisting of the organosilicon, organotin or organogermanium moiety of the "living" polymer and the residue of the chain transfer agent; and (c) contacting under polymerizing conditions at least one polar, acrylic-type or maleimide alpha-olefinic monomer with co-catalyst (ii) and the polymerization initiator formed in step (b) to produce "living polymer having an organosilicon, organotin or organogermanium moiety from the initiator, at the "living" ends of the polymer.

Representative carbon acid chain transfer agents have the aforesaid pKa and are of the formula CH(R$^6$)(R$^7$)(R$^8$) wherein each of R$^6$, R$^7$ and R$^8$ is independently selected from H, C$_{1-16}$ hydrocarbyl, C$_{1-16}$ substituted hydrocarbyl, a hetero atom-containing organic group, nitro and cyano, or any two or all three of R$^6$, R$^7$ and R$^8$ taken together is a C$_{4-8}$ alicyclic hydrocarbyl ring whch contains vinyl unsaturation and/or is fused to one or more aryl groups. The substituent on the substituted hydrocarbyl may be inert under polymerizing conditions, or it may induce chain-transfer by activating an adjacent C—H bond. Examples of the former include (CH$_3$)$_3$SiO— and —OCH$_3$; examples of the latter include —CN, —SR and —SO$_2$R wherein R is as defined above. Preferably, hydrocarbyl is C$_{1-12}$ alkyl or C$_{6-12}$ aryl, either of which may be unsubstituted or substituted; most preferably, hydrocarbyl is phenyl.

Chain transfer agents which are commonly used in anionic polymerization processes may be inoperable herein. For example, alcohols which are commonly so used are too acidic to be useful herein, that is, have a pKa of 18 or less. Similarly, compounds which have a pKa of 25 or more are inoperable herein. Correspondingly, compounds which are useful herein as chain transfer agents may be inoperable in art-recognized anionic polymerization processes.

Methods for measuring pKa values of carbon acids are critically reviewed by A. Streitwieser, Jr., E. Juaristi, and L. Nebenzahl in Chapter 7 of "Comprehensive Carbanion Chemistry", edited by E. Buncel T. Durst, Elsevier, N.Y., 1980, especially the method of F. G. Bordwell referred to therein, and by J. R. Jones, "The Ionization of Carbon Acids", Academic Press, N.Y., 1973.

Examples of compounds which are operable herein as chain transfer agents include 2-cyanofluorene (pKa~18.2), phenalene,

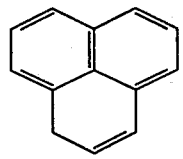

(pKa 19.45), phenylthioacetonitrile, C$_6$H$_5$SCH$_2$CN (pKa 20.8), 2-methylbenzeneacetonitrile, C$_6$H$_5$CH(CN)CH$_3$ (pKa 23.0), tris(phenylthio)methane, (C$_6$H$_5$S)$_3$CH (pKa 22.8), phenylthiobenzenesulfonylmethane, C$_6$H$_5$SCH$_2$SO$_2$C$_6$H$_5$ (pKa 20.3), trifluoromethylsulfonylmethane, CF$_3$SO$_2$CH$_3$ (pKa 18.76), benzenesulfonylmethyl diphenylphosphine, (C$_6$H$_5$)$_2$PCH$_2$SO$_2$C$_6$H$_5$ (pKa 20.2), trifluoromethylsulfonylethane, CF$_3$SO$_2$CH$_2$CH$_3$ (pKa 20.4), bis(diphenylmethyl)sulfone, (C$_6$H$_5$)$_2$CHSO$_2$CH(C$_6$H$_5$)$_2$ (pKa 21.9), benzylphenylsulfone, C$_6$H$_5$CH$_2$SO$_2$C$_6$H$_5$ (pKa 23.4),

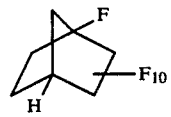

(pKa~20.5), phenylacetonitrile (pKa 21.9), acetone (pKa~20), 1-naphthaleneacetonitrile (pKa 20.8), 2-naphthaleneacetonitrile (pKa 20.6), 2-thiopheneacetonitrile (pKa 21.1) and 2-furanacetonitrile (pKa 21.3). Other operable chain transfer agents include 2-methyl-(1-naphthalene)acetonitrile, 2-methyl-(2-naphthalene)acetonitrile, 2-pyridineacetonitrile, 2-methyl-(2-pyridine)acetonitrile, 2-methyl-(3-trifluoromethylbenzene)acetonitrile, 2,2'-dimethylbenzenediacetonitriles, for example, 2,2'-dimethyl-(1,3-benzene)diacetonitrile, 1,3-benzenediacetonitrile, methyl 3-(2-cyanoethyl)benzoate, [(3-(2-cyanoethyl)benzoyl)oxy]trimethylsilane, 2-methyl-(4-chlorobenzene)acetonitrile, (4-methylbenzene)acetonitrile, 2-methyl(4-methylbenzene)acetonitrile, (1,3,5-benzene)triacetonitrile, 2,2',2''-trimethylbenzenetriacetonitriles, for example, 2,2',2''-trimethyl-1,3,5-benzenetriacetonitrile, 2-phenylsuccinonitrile, fluorene, indene and C$_{1-12}$ alkyl and C$_{1-12}$ substituted alkyl phenylacetates. The pKa of fluorene (Example 4) is ~21, the pKa of indene (Example 5) is 18.2, the pKa of methyl 2-phenylacetate (Example 1) is estimated to be ~22.3, the pKa of 2-trimethylsiloxyethyl phenylacetate (Example 2) is estimated to be ~22.3, and the pKa of methyl 4-methoxyphenylacetate (Example 3) is estimated to be ~22.8.

Since the anionic, nonanionic Lewis base and Lewis acid co-catalysts for the polymerization processes of the aforesaid patents also can serve as the catalyst for the chain transfer reaction, variation of the co-catalyst can be employed to enhance or reduce the amount of chain transfer which occurs with any particular chain transfer agent. Anionic co-catalysts which are suitable herein include, but are not intended to be limited to, F$^-$, $(CH_3)_3SiF_2^-$, $HF_2^-$, $CN^-$ and $N_3^-$, and the independently discovered $NO_2^-$, $OCN^-$ and carboxylates of the formula $RCO_2^-$ wherein R is an organic group which is free of any polymerization active substituent. Suitable Lewis acids include zinc chloride, bromide or iodide, boron trifluoride, alkylaluminum oxides or chlorides. Suitable nonanionic Lewis bases include those of the formula selected from $(R^4)_3M'$ and

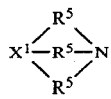

wherein:
M, is P or As;
$X^1$ is

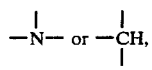

provided however, when the monomer is a nitrile, $X^1$ is

each $R^4$, independently, is $C_{1-12}$ alkyl, $C_{4-12}$ cycloalkyl, $C_{6-12}$ aralkyl or $di(C_{1-4}$ alkyl)amino, provided, however, two or three of the alkyl, cycloalkyl and/or aralkyl $R^4$ groups may be joined together by means of one or more carbon carbon bonds, and provided, however, the alkyl, cycloalkyl and aralkyl groups may contain within aliphatic segments thereof one or more hetero atoms selected from O, N and S and one or more substituents that are unreactive under polymerizing conditions; and each $R^5$ is $-CH_2CH_2-$, optionally containing one or more alkyl or other substituents that are unreactive under polymerizing conditions.

Variation of the polarity of the solvent can also change the effectiveness of a particular agent.

As disclosed in the examples hereinafter, the chain transfer agent can be introduced in the monomer feed, in a separate feed, or it can be charged to the reaction vessel prior to feeding of the monomer. In the case of a marginally effective chain transfer agent, chain transfer can be increased by increasing the concentration of chain transfer agent. In the extreme, the chain transfer agent may be used as the solvent for the polymerization.

It will be understood that each chain transfer event terminates a "living" polymer end and converts a chain transfer site (active hydrogen) into an initiating site comprising a Si, Sn or Ge-containing moiety. Thus, chain transfer is readily distinguishable from chain termination wherein there is termination without the concurrent formation of fresh initiator. Chain transfer agents having more than one active hydrogen atom may participate in more than one chain transfer event, forming initiators containing more than one initiating site. Chain transfer agents listed above include compounds having up to three chain transfer sites. Each new initiating site may initiate polymerization of unreacted monomers, producing "living" polymers, some of which are novel. It will be understood that these initiators can be separately prepared and employed in "living" polymerizations in the absence of chain transfer agents such as those described in the aforesaid patents.

Preferred chain transfer-derived initiators are prepared from carbon acids having the aforesaid pKa wherein active hydrogen-bearing carbon atoms are free of $-CN$ or $-C(O)X'$, wherein $X'$, is $-OSi(R^1)_3$, $-R$, $-OR$ or $NR'R''$ wherein R, $R^1$, $R'$ and $R''$ are as defined above. Representative of such carbon acids are those of the formula $CH(R^6)(R^7)$ wherein $R^6$, $R^7$ and are defined as above.

"Living" polymers prepared by polymerizing one or more polar monomers in the presence of these initiators and employing catalysts and process conditions described in the aforesaid patents comprise units of the monomers and contain, in the growing and grown polymer, Si-, Sn- or Ge-containing moieties at "living" ends and residues of the initiator at non-living ends of the polymer.

Novel "living" polymers are prepared in the presence of the preferred initiators described above. Representative novel "living" polymers have the formula $R_p[\overline{PQM}(R^1)_3]_p$ wherein:

$R_p$ is a radical, of valence p, which is the residue formed by removing at least one active hydrogen atom from a carbon acid having a pKa in the range $18<pKa<25$ and having at least one active hydrogen atom attached to a carbon atom which is free of $-CN$ and $-C(O)X'$ substituents;

p is an integer and is at least 1;
$\overline{P}$ is a divalent polymer radical of the formula

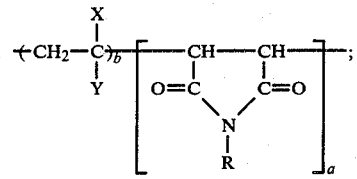

each of a and b is independently selected from 0 or a number in the range 1 to about 100,000, provided, however, (a+b) is at least 3;

Q is the divalent radical selected from the group consisting of

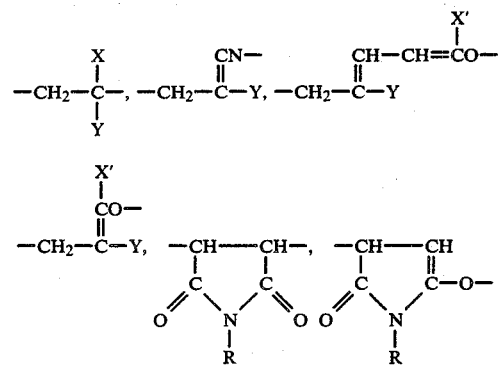

and mixtures thereof;
X is $-CN$, $-CH=CHC(O)X'$ or $-C(O)X'$;
Y is $-H$, $-CH_3$, $-CN$ or $-CO_2R$, provided, however, when X is $-CH=CHC(O)X'$, Y is $-H$ or $-CH_3$;

X' is —OSi(R$^1$)$_3$, —R, —OR or —NR'R";

each R$^1$, independently, is a hydrocarbyl radical, which is an aliphatic, alicyclic, aromatic or mixed aliphatic-aromatic radical containing up to 20 carbon atoms, or H, provided that at least one R$^1$ group is not H;

R is a hydrocarbyl radical, which is an aliphatic, alicyclic, aromatic or mixed aliphatic-aromatic radical containing up to 20 carbon atoms, or a polymeric radical containing at least 20 carbon atoms, either radical optionally containing one or more ether oxygen atoms within aliphatic segments thereof and optionally containing one or more functional substituents that are unreactive under polymerizing conditions;

each of R' and R" is independently selected from C$_{1-4}$ alkyl; and

M is Si, Sn or Ge.

Preferably, R$_p$ is unsubstituted hydrocarbyl.

The polymerization reactions which are described in the following examples were carried out at ambient temperatures. The polydispersity (D) of the polymer product of the examples is defined by D=$\overline{M}_w/\overline{M}_n$, the molecular weights being determined by gel permeation chromatography (GPC). Unless otherwise specified, the "living" polymer products obtained in the invention process were quenched by exposure to moist air before molecular weights were determined.

EXAMPLE 1

Chain Transfer in Polymerization of Methyl Methacrylate with Methyl Phenylacetate Feed A: 2 mL of methyl 2-phenylacetate containing 10 µL of b 1M tris(dimethylamino)sulfonium bifluoride/acetonitrile.

Feed B: 15 mL of methyl methacrylate (purified by passage over a short column of neutral alumina under argon) containing 20 µL of 1M tris(dimethylamino)sulfonium bifluoride/acetonitrile.

To a stirred solution of 0.69 g (0.76 mL, 2.5 mmol) of [(1-[2-trimethylsiloxyethoxy]-2-methyl-1-propenyl)oxy]-trimethylsilane in 20 mL of anhydrous tetrahydrofuran under an argon atmosphere was added 0.36 mL (2.5 mmol) of Feed A, followed 10 minutes later by 2.7 mL (2.5 mmol) of Feed B, followed by a 10 minute wait. Three additional identical sequential additions of Feeds A and B were carried out. Each addition of Feed B was accompanied by an exothermic reaction. Then, 6 mL of methanol and 1 mL of 1M tetrabutylammonium fluoride/tetrahydrofuran was added, and the solution was heated at reflux for 30 minutes. Evaporation gave 16 g of solid polymer which was dissolved in methylene chloride and precipitated by addition to hexane. Gel permeation chromatography (GPC) of the product showed $\overline{M}_n$ 1460, $\overline{M}_w$ 2810 (theor. $\overline{M}_n$: no chain transfer, 4100; 100% chain transfer, ~900), D=1.93. High performance liquid chromatography (HPLC) of the product in ethyl acetate on a 3.2×250 mm Lichrosorb Si60 column showed that the polymer consisted of 53% poly(methyl methacrylate) (1.46 minutes at flow rate of 1.0 cc/min, 123 psi pressure) and 47% poly(methyl methacrylate) with a terminal hydroxyl group (1.97 minutes). The hydroxy-poly(methyl methacrylate) resulted from direct initiation by [(1-[2-trimethylsiloxyethoxy]-2-methyl-1-propenyl)oxy]trimethylsilane, and the poly(methyl methacrylate) resulted from chain transfer by methyl phenylacetate. Thus, nearly equal amounts of polymer were initiated directly and by the chain transfer reaction.

EXAMPLE 2

Terminal Functionalization by Chain Transfer in Polymerization of Methyl Methacrylate Using 2-Trimethylsiloxyethyl Phenylacetate—Batch Process To a stirred solution of 0.25 mL (1.25 mmol) of [(1-methoxy-2-methyl-1-propenyl)oxy]trimethylsilane (MTS), 0.95 g (0.93 mL, 3.75 mmol) of 2-trimethylsiloxyethyl phenylacetate (prepared by the reaction of chlorotrimethylsilane and triethylamine with 2-hydroxyethyl phenylacetate) and 10 g (10.8 mL, 100 mmol) of methyl methacrylate (purified as in Example 1) in 40 mL of anhydrous tetrahydrofuran was added 10 µL of 1M tris(dimethylamino)sulfonium bifluoride/acetonitrile. When the exothermic reaction was complete, 6 mL of methanol and 1 mL of 1M tetrabutylammonium fluoride/tetrahydrofuran was added, and the mixture was heated at reflux for 30 minutes. Evaporation in vacuo gave 8.9 g of solid polymer which was purified by dissolving in methylene chloride, washing with water, drying (MgSO$_4$), concentrating and twice precipitating with hexane. GPC of the product showed $\overline{M}_n$ 3250, $\overline{M}_w$ 4490 (theor. $\overline{M}_n$ for 89% conversion: no chain transfer, 7200; 100% chain transfer, 2000; 50% chain transfer, 3700), D=1.38. HPLC analysis by the procedure of Example 1 showed 51% poly(methyl methacrylate) derived from direct initiation by the ketene silyl acetal and 49% terminal hydroxy-poly(methyl methacrylate) derived from chain transfer by 2-trimethylsiloxyethyl phenylacetate.

EXAMPLE 3

Chain Transfer in Polymerization of Methyl Methacrylate with Methyl 4-Methoxyphenylacetate To a stirred solution of 0.69 g (0.76 mL 2.5 mmol) of [(1-[2-trimethylsiloxyethoxy]-2-methyl-1-propenyl)oxy]trimethylsilane and 10 µL of 1M tris(dimethylamino)sulfonium bifluoride/benzonitrile in 20 mL of anhydrous tetrahydrofuran under argon was added slowly a mixture of 10 g (10.8 mL, 100 mmol) of methyl methacrylate (purified as in Example 1), 1.35 g (1.19 mL, 7.5 mmol) of methyl 4-methoxyphenylacetate, and 20 µL of 1M tris(dimethylamino)sulfonium bifluoride/benzonitrile. Thirty minutes after the end of the exothermic reaction, 6 mL of methanol and 1 mL of 1M tetrabutylammonium fluoride/tetrahydrofuran was added, and the mixture was heated at reflux for 30 minutes. Evaporation in vacuo gave 11.5 g of solid polymer. The polymer was dissolved in methylene chloride, washed with aqueous ammonium chloride, dried (MgSO$_4$), and precipitated with hexane. GPC of the product showed 8% of a high molecular weight product, $\overline{M}_n$ 348,000, $\overline{M}_w$ 697,000, and 92% of polymer with $\overline{M}_n$ 2010, $\overline{M}_w$ 2810 (theor. M$_n$: no chain transfer, 4100; 100% chain transfer, 1100), D=1.40. HPLC analysis by the procedure of Example 1 showed 48% poly(methyl methacrylate) derived from chain transfer by methyl p-methoxyphenylacetate) and 52% terminal hydroxy-poly(methyl methacrylate) derived from direct initiation by the ketene silyl acetal. Strong ultraviolet absorption at 254 nm by the poly(methyl methacrylate) fraction is consistent with the presence of a p-methoxyphenyl group at the end of the polymer due to chain transfer initiation.

EXAMPLE 4

Chain Transfer in Polymerization of Methyl Methacrylate with Fluorene

To a solution of 0.76 mL (2.5 mmol) of [(1-[2-trimethylsiloxyethoxy]-2-methyl-1-propenyl)oxy]trimethylsilane and 10 μL of 1M tris(dimethylamino)sulfonium bifluoride/benzonitrile in 20 mL of anhydrous tetrahydrofuran under argon was added a mixture of 10 g (10.8 mL, 100 mmol) of methyl methacrylate (purified as in Example 1), 10 μL of 1M tris(dimethylamino)sulfonium bifluoride/benzonitrile, and 1.25 g (7.5 mmol) of fluorene. Thirty minutes after the end of the exothermic reaction, 6 mL of methanol and 1 mL of 1M tetrabutylammonium fluoride/tetrahydrofuran were added, and the mixture was heated at reflux for 30 minutes. Evaporation in vacuo gave 10.5 g of solid polymer which was purified by dissolving in methylene chloride, washing with aqueous ammonium chloride, drying (MgSO$_4$), concentrating, and precipitating with hexane. GPC of the product showed $\overline{M}_n$ 2810, $\overline{M}_w$ 3250 (theor. $\overline{M}_n$: no chain transfer, 4130; 100% transfer, 1130), D=1.16. HPLC analysis by the procedure of Example 1 showed 19.1% poly(methyl methacrylate) derived from chain transfer and 80.9% of terminal hydroxypoly(methyl methacrylate) derived from direct initiation by the ketene silyl acetal. Strong ultraviolet absorption at 254 nm by the poly(methyl methacrylate) fraction is consistent with the presence of a fluorene group at the end of the polymer chain due to chain transfer initiation.

EXAMPLE 5

Chain Transfer in Polymerization of Methyl Methacrylate with Indene

The procedure of Example 4 was used with 0.87 g (0.87 mL, 7.5 mmol) of indene instead of fluorene to give, after evaporation, 4.4 g of solid polymer, GPC: $\overline{M}_n$ 644, $\overline{M}_w$ 1350 (theor. $M_n$ for 35% conversion: no chain transfer, 1540), D=2.1. HPLC showed 53.4% poly(methyl methacrylate) derived from chain transfer (strong ultraviolet absorption) and 46.6% hydroxypoly(methyl methacrylate) derived from direct initiation by the ketene silyl acetal (feeble ultraviolet absorption).

EXAMPLE 6

Chain Transfer in Polymerization of Methyl Methacrylate with γ-Thiobutyrolactone To a stirred solution of 20 μL of 1M tris(dimethylamino)sulfonium bifluoride/acetonitrile and 0.414 g (0.46 mL, 1.5 mmol) of [(1-[2-trimethylsiloxyethoxy]-2-methyl-1-propenyl)oxy]trimethylsilane in 25 mL of anhydrous tetrahydrofuran was added dropwise 15 g (16.2 mL, 150 mmol) of methyl methacrylate containing 0.46 g (0.39 μL, 4.5 mmol) of γ-thiobutyrolactone and 10 μL of 1M tris(dimethylamino)sulfonium bifluoride/acetonitrile. When the exothermic reaction was finished, 1 mL of methanol was added and the solution was evaporated in vacuo to 8.89 g of solid polymer. The polymer was purified by dissolving in methylene chloride, washing with water, drying (MgSO$_4$) and precipitating with hexane. GPC of the product showed $\overline{M}_n$ 3880, $\overline{M}_w$ 6080 (theor. $\overline{M}_n$ for 59% conversion: no chain transfer, 6000; 100% chain transfer, 1300), D=1.57. Anal. Calcd. for MW 3880, 50% chain transfer: S, 0.42; Si, 0.36. Found: S, 0.42; Si, 0.36. The analytical data show that approximately 50% of the polymer resulted from chain transfer by γ-thiobutyrolactone and 50% resulted from direct initiation by [(1-[2-trimethylsiloxyethoxy]-2-methyl-1-propenyl)oxy]trimethylsilane.

EXAMPLE 7

Chain Transfer in Polymerization of Methyl Methacrylate with Methyl Phenylacetate To a stirred solution of 0.5 mL (2.5 mmol) of [(1-methoxy-2-methyl-1-propenyl)oxy]trimethylsilane and 10 μL of 1M tris(dimethylamino)sulfonium bifluoride/acetonitrile in 20 mL of anhydrous tetrahydrofuran was added dropwise a mixture of 10.8 mL (100 mmol) of methyl methacrylate, 10 μL of 1M tris(dimethylamino)sulfonium bifluoride/acetonitrile, and 1.13 g (1.08 mL, 7.5 mmol) of methyl phenylacetate (purified by passage over basic alumina). A slow exothermic polymerization occurred. Thirty minutes after the end of the exotherm, 3 mL of methanol was added, and the solution was evaporated to give about 12.2 g of poly(methyl methacrylate). GPC showed $\overline{M}_n$ 1670, $\overline{M}_w$ 3090, D=1.85 (theor. $\overline{M}_n$ 100% chain transfer, 1100; no chain transfer, 4100). The $\overline{M}_n$ of the polymer indicates that reasonably efficient chain transfer occurred.

EXAMPLE 8

Chain Transfer in Polymerization of Methyl Methacrylate with Phenylacetonitrile To a stirred solution of 0.2 mL (1 mmol) of [(1-methoxy-2-methyl-1-propenyl)oxy]trimethylsilane and 20 μL of 1M tris(dimethylamino)sulfonium bifluoride/acetonitrile in 30 mL of anhydrous tetrahydrofuran was added dropwise a solution of 0.47 g (0.48 mL, 4 mmol) of phenylacetonitrile and 10 μL of 1M tris(dimethylamino)sulfonium bifluoride/acetonitrile in 10.8 mL (100 mmol) of methyl methacrylate. A bright yellow color formed and an exothermic polymerization occurred. Fifteen minutes after the end of the exothermic reaction, 1 mL of methanol was added (color was discharged) and a polymer sample was removed for analysis. NMR showed that conversion to polymer was 96%. GPC showed $\overline{M}_n$ 2510, $\overline{M}_w$ 4180, D=1.66 (theor. $\overline{M}_n$ for 96% conversion: no chain transfer, 9700; 100% chain transfer, 1920). U.V. analysis of the poly(methyl methacrylate) after precipitation with aqueous methanol showed a molecular weight of 3020 per terminal phenyl group, consistent with 83% of the polymer resulting from initiation by the chain transfer agent, phenylacetonitrile.

EXAMPLE 9

Chain Transfer Polymerization of Methyl Methacrylate with 2-Methylbenzeneacetonitrile To a solution of 0.1 mL (0.5 mmol) of MTS (defined in Example 10) and 20 μL of 0.46M tetrabutylammonium m-chlorobenzoate/acetonitrile in 30 mL of tetrahydrofuran was added a solution of 459 mg (0.466 mL, 3.5 mmol) of 2-methylbenzeneacetonitrile in 10.8 mL (100 mmol) of methyl methacrylate. After the monomer/transfer agent had been added, a slow exotherm began and the temperature gradually rose 22° C., then slowly fell. NMR analysis showed 94% conversion to polymer. Precipitation with aqueous methanol gave 9.6 g of poly(methyl methacrylate). GPC showed $\overline{M}_n$ 4420, $\overline{M}_w$ 10,700, D=2.42 (theory $\overline{M}_n$: no chain transfer, 18,900; initiation only by 2-methylbenzeneacetonitrile, 2816). U.V. showed $k_{258}=0.054$ corresponding to a $\overline{M}_n$ of 3190 per phenyl group.

EXAMPLE 10

Chain Transfer in Polymerization of Methyl Methacrylate with 2-Methylbenzeneacetonitrile To a solution of 0.17 mL (0.85 mmol) of [(1-methoxy-2-methyl-1-propenyl)oxy]trimethylsilane (MTS) and 15 μL of 1M tris(dimethylamino)sulfonium bifluoride/acetonitrile in 30 mL of tetrahydrofuran was added 4.6 mL (42.6 mmole) of methyl methacrylate. When the exothermic reaction had ended, 111.5 mg (113 μL, 0.85 mmol) of 2-methylbenzeneacetonitrile was added, giving a yellow color. Then, 2.6 mL (24 mmol) of methyl methacrylate was added, which caused extinction of the color and exothermic polymerization. When the exotherm had ended, 113 μL (0.85 mmol) of 2-methylbenzeneacetonitrile was added, giving a yellow color. Then, 3.6 mL (33.3 mmol) of methyl methacrylate was added, causing extinction of the yellow color and exothermic polymerization. NMR analysis of a sample of the reaction mixture showed complete conversion of the methyl methacrylate to poly(methyl methacrylate). Precipitation of the polymer with 50% aqueous methanol gave 10 g of poly(methyl methacrylate). GPC showed $\overline{M}_n$ 3790, $\overline{M}_w$ 6390, D=1.68 (theory $\overline{M}_n$: no chain transfer, 11,860; 100% chain transfer, 4050).

EXAMPLE 11

Chain Transfer with 2-Methylbenzeneacetonitrile in the Polymerization of Methyl Methacrylate Catalyzed with Bis(dimethylamino)methylphosphine To a stirred solution of 0.2 mL (1 mmol) of MTS and 26 μL (0.2 mmol) of bis(dimethylamino)methylphosphine in 10 mL of propylene carbonate at 50° was added a solution of 0.664 mL (5 mmol) of 2-methylbenzeneacetonitrile in 10 g (10.8 mL, 100 mmol) of MMA. After the addition was complete, a slow exotherm caused the temperature to rise slowly to 60° and then more rapidly to 72°. Precipitation into aqueous methanol gave 10.1 g of poly(methyl methacrylate), $\overline{M}_n$ 1590, $\overline{M}_w$ 5690, D=3.52 (theoretical $\overline{M}_n$, no transfer 10,100; 100% transfer 1700). The NMR spectrum of the polymer showed 23 MMA units per terminal aromatic ring derived from the chain transfer agent, 2-methylbenzeneacetonitrile, indicating that chain transfer occurred.

This example also appears in copending application Serial No. 701,681 (supra) wherein one of applicants herein is the applicant therein.

BEST MODE FOR CARRYING OUT THE INVENTION

The best mode presently contemplated for carrying out the invention is illustrated by Examples 1, 2, 8, 9 and 10.

Utility for the Invention

Although preferred embodiments of the invention have been illustrated and described hereinabove, it is to be understood that there is no intent to limit the invention to the precise constructions herein disclosed, and it is to be further understood that the right is reserved to all changes and modifications coming within the scope of the invention as defined in the appended claims.

The invention process provides a novel method of controlling molecular weight and functionality of polymers prepared in polymerization processes disclosed in the aforesaid patents, while using lesser amounts of relatively costly polymerization initiators. The polymer products are widely useful in commercial applications, such as coatings, plastics and films.

What is claimed is:

1. Chain transfer agent-regulated process comprising:
   (a) contacting under polymerizing conditions at least one polar, acrylic or maleimide monomer with (i) a tetracoordinate organosilicon, organotin or organogermanium polymerization initiator having at least one initiating site, and (ii) a co-catalyst which is a source of bifluoride, fluoride, cyanide, or azide ions or which is a suitable oxyanion, Lewis acid or nonanionic Lewis base, to produce "living" polymer having an organosilicon, organotin or organogermanium moiety, from the initiator, at the "living" ends of the polymer;
   (b) contacting "living" polymer produced in the process and having an organosilicon, organotin or organogermanium moiety at the "living" ends with a chain transfer agent which is a carbon acid having a pKa in the range of $18<pKa<25$ and which contains at least one reactive hydrogen atom which terminates the growth of "living" polymer, so as to terminate the growth of at least some of the "living" polymer and to form a polymerization initiator having at least one initiating site and consisting of the organosilicon, organotin or organogermanium moiety of the "living" polymer and the residue of the chain transfer agent; and
   (c) contacting under polymerizing conditions at least one polar, acrylic or maleimide monomer with co-catalyst (ii) and the polymerization initiator formed in step (b) to produce "living polymer having an organosilicon, organotin or organogermanium moiety from the initiator, at the "living" ends of the polymer.

2. Process of Claim 1 wherein steps (b) and (c) are repeated.

3. Process of claim 2 wherein steps (b) and (c) are repeated a plurality of times.

4. Process of claim 1 wherein the chain transfer agent is of the formula $CH(R^6)(R^7)(R^8)$ wherein each of $R^6$, $R^7$ and $R^8$ is independently selected from H, $C_{1-16}$ hydrocarbyl, $C_{1-16}$ substituted hydrocarbyl, a hetero atom-containing organic group, nitro and cyano, or any two or all three of $R^6$, $R^7$ and $R^8$ taken together is a $C_{4-8}$ alicyclic hydrocarbyl ring which contains vinyl unsaturation and/or is fused to one or more aryl groups.

5. Process of claim 4 wherein one of $R^6$, $R^7$ and $R^8$ is $C_{6-12}$ aryl or $C_{6-12}$ substituted aryl.

6. Process of claim 5 wherein one of $R^6$, $R^7$ and $R^8$ is a heteroatom-containing organic group.

7. Process of claim 6 wherein the chain transfer agent is a $C_{1-12}$ alkyl- or $C_{1-12}$ substituted alkyl phenylacetate.

8. Process of claim 5 wherein one of $R^6$, $R^7$ and $R^8$ is cyano.

9. Process of claim 8 wherein the chain transfer agent is phenylacetonitrile or 2-methylbenzeneacetonitrile.

10. Process of claim 8 wherein aryl is substituted with —CH$_2$CN or —CH(CH$_3$)CN.

11. Process of claim 10 wherein the chain transfer agent is an 2,2,'-dimethylbenzenediacetonitrile.

12. Process of claim 10 wherein the agent is an 2,2',2''-trimethylbenzenetriacetonitrile.

13. Process of claim 4 wherein two of $R^6$, $R^7$ and $R^8$ taken together is $C_{4-8}$ alicyclic hydrocarbyl ring which contains vinyl unsaturation and/or is fused to one or more aryl groups.

14. Process of claim 13 wherein the chain transfer agent is fluorene.

15. Process of claim 13 wherein the agent is indene.

16. Process of claim 13 wherein the agent is γ-thiobutyrolactone.

17. Polymer prepared by the process of claim 1.

18. Polymer prepared by the process of claim 4.

19. Process of quenching the polymer of claim 17.

20. Product of the process of claim 19.

21. Solution of the polymer of claim 17.

22. Coating prepared from the solution of claim 21.

23. Solution of the product of claim 20.

24. Coating prepared from the solution of claim 23.

25. "Living" polymer of the formula $R_p[\overline{P}QM(R^1)_3]_p$ wherein:

$R_p$ is a radical, of valence p, which is the residue formed by removing at least one active hydrogen atom from a carbon acid having a pKa in the range $18 < pKa < 25$ and having at least one active hydrogen atom attached to a carbon atom which is free of —CN and —C(O)X' substituents;

p is an integer and is at least 1;

$\overline{P}$ is a divalent polymer radical of the formula

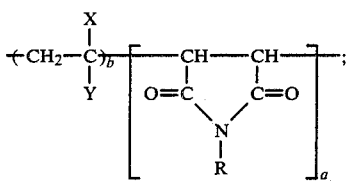

each of a and b is independently selected from 0 or a number in the range 1 to about 100,000, provided, however, (a+b) is at least 3;

Q is the divalent radical selected from the group consisting of

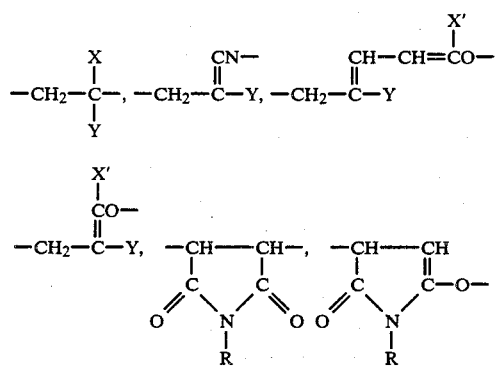

and mixtures thereof;

X is —CN, —CH=CHC(O)X' or —C(O)X';

Y is —H, —CH$_3$, —CN or —CO$_2$R, provided, however, when X is —CH=CHC(O)X', Y is —H or —CH$_3$;

X' is —OSi(R$^1$)$_3$, —R, —OR or —NR'R";

each R$^1$, independently, is a hydrocarbyl radical, which is an aliphatic, alicyclic, aromatic or mixed aliphatic-aromatic radical containing up to 20 carbon atoms, or H, provided that at least one R$^1$ group is not H;

R is a hydrocarbyl radical, which is an aliphatic, alicyclic, aromatic or mixed aliphatic-aromatic radical containing up to 20 carbon atoms, or a polymeric radical containing at least 20 carbon atoms, either radical optionally containing one or more ether oxygen atoms within aliphatic segments thereof and optionally containing one or more functional substituents that are unreactive under polymerizing conditions;

each of R' and R" is independently selected from C$_{1-4}$ alkyl; and

M is Si, Sn or Ge.

26. "Living" polymer of claim 25 wherein the carbon acid is of the formula CH(R$^6$)(R$^7$)(R$^8$) wherein each of R$^6$, R$^7$ and R$^8$ is independently selected from H, C$_{1-16}$ hydrocarbyl, C$_{1-16}$ substituted hydrocarbyl, a hetero atom-containing organic group, nitro and cyano, or any two or all three of R$^6$, R$^7$ and R$^8$ taken together is a C$_{4-8}$ alicyclic hydrocarbyl ring which contains vinyl unsaturation and/or is fused to one or more aryl groups.

27. "Living" polymer consisting essentially of repeat units of at least one polar, acrylic or maleimide monomer and having a Si-, Sn- or Ge-containing moiety at "living" ends and, at non-living ends, a residue formed by removing at least one active hydrogen atom from a carbon acid having a pKa in the range $18 < pKa < 25$ and having at least one active hydrogen atom attached to a carbon atom which is free of —CN and —C(O)X' substituents wherein:

X' is —OSi(R$^1$)$_3$, —R, —OR or —NR'R";

R is a hydrocarbyl radical, which is an aliphatic, alicyclic, aromatic or mixed aliphatic-aromatic radical containing up to 20 carbon atoms, or a polymeric radical containing at least 20 carbon atoms, either radical optionally containing one or more ether oxygen atoms within aliphatic segments thereof and optionally containing one or more functional substituents that are unreactive under polymerizing conditions;

each R$^1$, independently, is a hydrocarbyl radical, which is an aliphatic, alicyclic, aromatic or mixed aliphatic-aromatic radical containing up to 20 carbon atoms, or H, provided that at least one R$^1$ group is not H; and each of R' and R" is independently selected from C$_{1-4}$ alkyl.

28. "Living" polymer of claim 27 wherein the carbon acid is of the formula CH(R$^6$)(R$^7$)(R$^8$) wherein each of R$^6$, R$^7$ and R$^8$ is independently selected from H, C$_{1-16}$ hydrocarbyl, C$_{1-16}$ substituted hydrocarbyl, a hetero atom-containing organic group, nitro and cyano, or any two or all three of R$^6$, R$^7$ and R$^8$ taken together is a C$_{4-8}$ alicyclic hydrocarbyl ring which contains vinyl unsaturation and/or is fused to one or more aryl groups.

29. Process of preparing a "living" polymer comprising contacting under polymerizing conditions at least one polar, acrylic or maleimide monomer with (i) a tetracoordinate organosilicon, organotin or organogermanium polymerization initiator having at least one initiating site and (ii) a co-catalyst which is a source of bifluoride, fluoride, cyanide or azide ions or which is a suitable oxyanion, Lewis acid or nonanionc Lewis base, the initiator consisting of a Si-, Sn- or Ge-containing moiety and the moiety obtained after removal of at least one active hydrogen atom from a carbon acid having a pKa in the range $18 < pKa < 25$ and which is free of —CN and —C(O)X' substituents attached to a carbon atom having an active hydrogen attached thereto, wherein, in —C(O)X':

X' is —OSi($R^1$)$_3$, —R, —OR or —NR'R''; each $R^1$, independently, is a hydrocarbyl radical, which is an aliphatic, alicyclic, aromatic or mixed aliphatic-aromatic radical containing up to 20 carbon atoms, or H, provided that at least one $R^1$ group is not H; R is a hydrocarbyl radical, which is an aliphatic, alicyclic, aromatic or mixed aliphatic-aromatic radical containing up to 20 carbon atoms, or a polymeric radical containing at least 20 carbon atoms, either radical optionally containing one or more ether oxygen atoms within aliphatic segments thereof and optionally containing one or more functional substituents that are unreactive under polymerizing conditions; and each of R' and R'' is independently selected from $C_{1-4}$ alkyl.

30. Process of claim 29 wherein the carbon acid is of the formula CH($R^6$)($R^7$)($R^8$) wherein each of $R^6$, $R^7$ and $R^8$ is independently selected from H, $C_{1-16}$ hydrocarbyl, $C_{1-16}$ substituted hydrocarbyl, a hetero atom-containing organic group, nitro and cyano, or any two or all three of $R^6$, $R^7$ and $R^8$ taken together is a $C_{4-8}$ alicyclic hydrocarbyl ring which contains vinyl unsaturation and/or is fused to one or more aryl groups.

* * * * *